US012637003B2

(12) United States Patent
Fukazawa

(10) Patent No.: US 12,637,003 B2
(45) Date of Patent: May 26, 2026

(54) VEHICLE CONTROL DEVICE AND VEHICLE CONTROL METHOD

(71) Applicant: TOYOTA JIDOSHA KABUSHIKI KAISHA, Aichi (JP)

(72) Inventor: Kazuki Fukazawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/818,590

(22) Filed: Aug. 29, 2024

(65) Prior Publication Data

US 2025/0083598 A1     Mar. 13, 2025

(30) Foreign Application Priority Data

Sep. 7, 2023    (JP) ................................. 2023-145121

(51) Int. Cl.
B60Q 9/00        (2006.01)
G08G 1/16        (2006.01)

(52) U.S. Cl.
CPC ............. B60Q 9/008 (2013.01); G08G 1/166 (2013.01)

(58) Field of Classification Search
CPC ................................. B60Q 9/008; G08G 1/166
See application file for complete search history.

(56) References Cited

U.S. PATENT DOCUMENTS 9,969,261 B2    5/2018  Kodama
10,045,173 B1   8/2018  Morimura et al.

| | | |
|---|---|---|
| 10,106,157 B2 | 10/2018 | Sawada et al. |
| 10,150,407 B2 | 12/2018 | Takahashi et al. |
| 10,696,297 B2 | 6/2020 | Nguyen Van et al. |
| 11,001,255 B2 | 5/2021 | Fukuman et al. |
| 11,110,937 B2 | 9/2021 | Kinoshita et al. |
| 2004/0189451 A1* | 9/2004 | Zoratti ................... G08G 1/166 |
| | | 340/435 |
| 2008/0211644 A1* | 9/2008 | Buckley ................. G08G 1/165 |
| | | 340/932.2 |
| 2014/0015693 A1* | 1/2014 | Komoguchi ........... G08G 1/166 |
| | | 340/935 |
| 2015/0009330 A1* | 1/2015 | Sobue .................... G06V 20/58 |
| | | 348/148 |

(Continued)

FOREIGN PATENT DOCUMENTS

| JP | 2017-013756 A | 1/2017 |
|---|---|---|
| JP | 2023064008 A | 5/2023 |
| WO | 2023162559 A1 | 8/2023 |

*Primary Examiner* — Mohamed Barakat
(74) *Attorney, Agent, or Firm* — HAUPTMAN HAM, LLP

(57) ABSTRACT

To optimize the execution or the suppression of the alert, provided is a control device comprising a first notification unit notify a driver of a vehicle of the approaching moving object, when a moving object is detected; a second notification unit notify the driver of the approach to a stationary object, when the stationary object is detected; and a notification suppress unit suppresses, when a specific condition is satisfied where the stationary object is detected and the moving object farther away from the own vehicle than the stationary object is detected, the notification by the first notification unit if the attribute of the moving object is a first attribute, and suppresses, if the attribute of the moving object is a second attribute, the notification by the first notification unit only when the stationary object is detected over a predetermined range.

5 Claims, 5 Drawing Sheets

(56) References Cited

U.S. PATENT DOCUMENTS

| | | | |
|---|---|---|---|
| 2015/0185319 A1* | 7/2015 | Matsuura ............... | G08G 1/167 |
| | | | 73/627 |
| 2017/0008517 A1* | 1/2017 | Himi ....................... | G01S 15/87 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2021/0162992 A1* | 6/2021 | Ikezawa .......... | B60W 30/18154 |
| 2023/0127044 A1 | 4/2023 | Takagi et al. | |

* cited by examiner

VEHICLE CONTROL DEVICE AND VEHICLE CONTROL METHOD

CROSS-REFERENCE TO RELATED APPLICATION

This application claims priority to Japanese Patent Application No. JP 2023-145121 filed on Sep. 7, 2023, the content of which is hereby incorporated by reference in its entirety into this application.

BACKGROUND OF THE INVENTION

1. Field of the Invention

The present disclosure relates to a vehicle control device and a vehicle control method.

2. Description of the Related Art

For example, Japanese Patent Application Laid-Open (kokai) No. 2017-013756 discloses a device that, upon detecting an approaching object approaching an own vehicle from behind and an obstruction behind the own vehicle, suppresses the activation of an alert that notifies the driver of the own vehicle of the presence of the approaching object if the approaching object is farther away from the own vehicle than the obstruction.

For example, if the approaching object is another vehicle and there is a stationary object between the other vehicle and the own vehicle, it is unlikely that the other vehicle will pass the stationary object and approach the own vehicle. In such a case, there is no necessary to alert the driver of the own vehicle of the approaching vehicle. However, if the approaching object is a pedestrian, there is a possibility that the pedestrian may avoid the stationary object and approach the vehicle, depending on the obstructing condition of the stationary object. In other words, if the alert is uniformly suppressed based only on the presence of a stationary object between the vehicle and the approaching object, there may be cases where suppression of the alert is not appropriate, depending on the relationship between the attributes of the approaching object (moving object) and the shielding state of the stationary object.

SUMMARY OF THE INVENTION

It is an object of the present disclosure to optimize the execution or the suppression of the alert to the driver based on the relationship between the attributes of the moving object and the shielding state of the stationary object.

A device according to at least one embodiment of the present disclosure is a vehicle control device. The vehicle control device comprising: a first notification unit configured to notify a driver of an own vehicle of the approaching moving object, when a moving object approaching from outside to a predetermined area located in a path of travel of the own vehicle and located within a predetermined distance from the vehicle is detected by a first detection unit; a second notification unit configured to notify the driver of the approach to a stationary object, when the stationary object existing in a predetermined area in which the distance from the own vehicle is within a predetermined range is detected by a second detection unit; and a notification suppress unit configure to suppresses, when a specific condition is satisfied where the second detection unit detect the stationary object and the first detection unit detect the moving object farther away from the own vehicle than the stationary object, the notification by the first notification unit if the attribute of the moving object is a first attribute, and configure to suppresses, if the attribute of the moving object is a second attribute different from the first attribute, the notification by the first notification unit only when the second detection unit detect the stationary object over a predetermined range in the width direction of the own vehicle.

A method according to at least one embodiment of the present disclosure is a vehicle control method. The vehicle control method comprising the steps of: executing a first notification to notify a driver of an own vehicle of the approaching moving object, when a moving object approaching from outside to a predetermined area located in a path of travel of the own vehicle and located within a predetermined distance from the vehicle is detected by a first detection unit; executing a second notification to notify the driver of the approach to a stationary object, when the stationary object existing in a predetermined area in which the distance from the own vehicle is within a predetermined range is detected by a second detection unit; and suppressing, when a specific condition is satisfied where the second detection unit detect the stationary object and the first detection unit detect the moving object farther away from the own vehicle than the stationary object, the first notification if the attribute of the moving object is a first attribute, and suppresses, if the attribute of the moving object is a second attribute different from the first attribute, the first notification only when the second detection unit detect the stationary object over a predetermined range in the width direction of the own vehicle.

DESCRIPTION OF THE EMBODIMENTS

Description is now given of a vehicle control device and a vehicle control method according to at least one embodiment of the present disclosure with reference to the drawings.

(Hardware Configuration)

Figure 1:
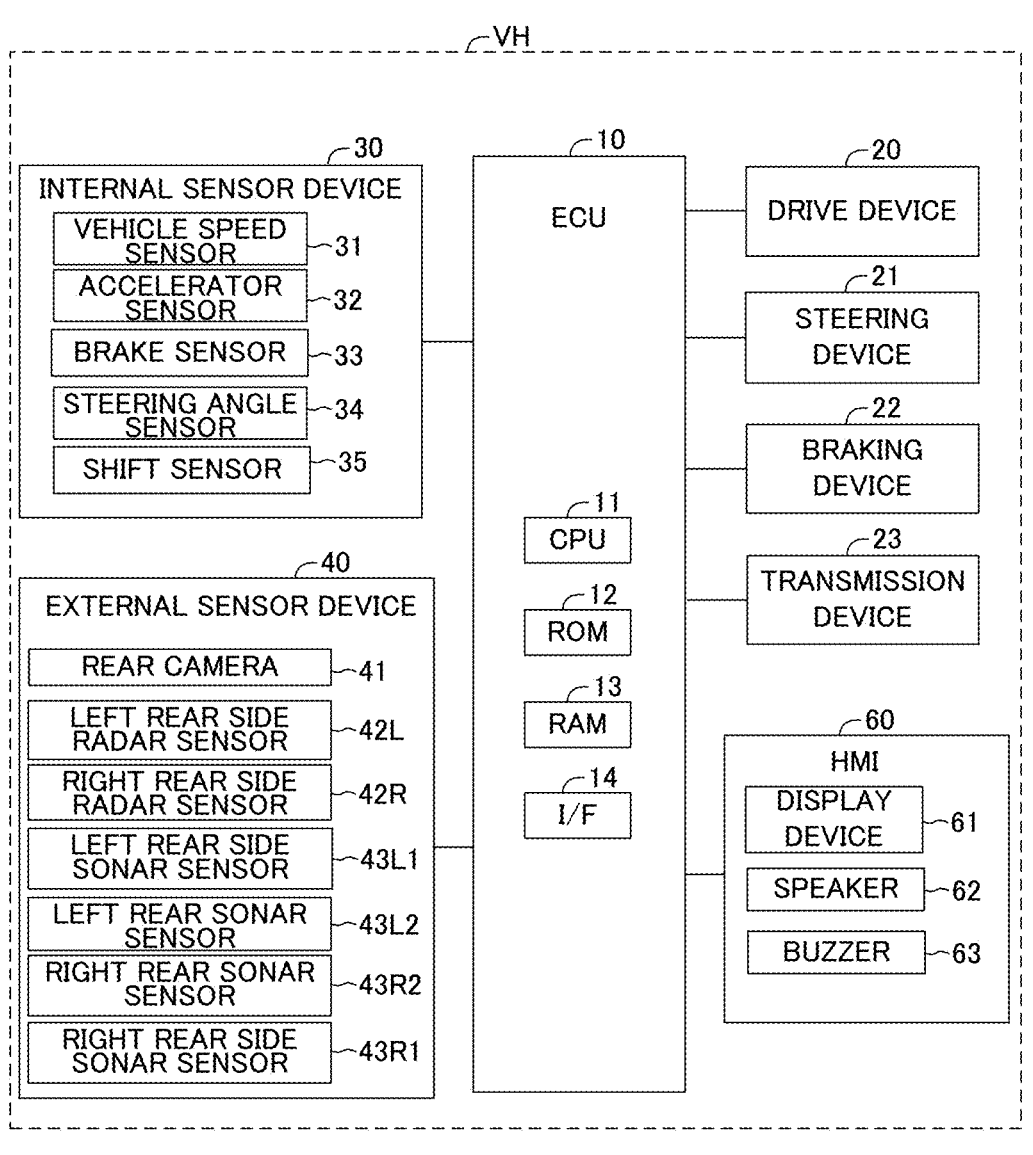
FIG. 1 is a schematic diagram showing a hardware configuration of a vehicle according to the present embodiment.

FIG. 1 is a schematic diagram of a hardware configuration of a vehicle VH to which the control device according to the present embodiment is applied. Hereinafter, the vehicle VH may be referred to as an own vehicle when it is required to distinguish it from other vehicles.

The vehicle VH has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes driving assist control of the vehicle VH. The driving assist control is a concept which encompasses automatic driving control. A drive device 20, a steering device 21, a braking device 22, a transmission device 23, an internal sensor device 30, an external sensor device 40, a HMI (Human Machine Interface) 60, and the like are communicably connected to the ECU 10.

The drive device 20 generates a driving force to be transmitted to driving wheels of the vehicle VH. As the drive device 20, for example, an engine and a motor are given. In the device according to the at least one embodiment, the vehicle VH may be any one of a hybrid electric vehicle (HEV), a plug-in hybrid electric vehicle (PHEV), a fuel cell electric vehicle (FCEV), a battery electric vehicle (BEV), and an engine vehicle. The steering device 21 applies steering forces to steerable wheels of the vehicle VH. The braking device 22 applies a braking force to the wheels of the vehicle VH. The transmission device 23 transmits the drive power output from the drive device 20 to the drive wheels while reducing the speed at a predetermined reduction ratio.

The internal sensor device 30 is sensors which acquire states of the vehicle VH. Specifically, the internal sensor device 30 includes a vehicle speed sensor 31, an accelerator sensor 32, a brake sensor 33, a steering angle sensor 34, a shift sensor 35, and the like.

The vehicle speed sensor 31 detects a travel speed (vehicle speed v) of the vehicle VH. The accelerator sensor 32 detects an operation amount of an accelerator pedal (not shown) by the driver. The brake sensor 33 detects an operation amount of a brake pedal (not shown) by the driver. The steering angle sensor 34 detects a rotational angle of a steering wheel or a steering shaft (not shown) of the vehicle VH, that is, a steering angle. The shift sensor 35 detects the shift position (parking P, reverse R, neutral N, drive D, etc.) of the transmission device 23. The internal sensor device 30 transmits the condition of the vehicle VH detected by the sensors 31 to 35 to the ECU 10 at a predetermined cycle.

The external sensor device 40 is a type of sensor that recognizes object information about objects present behind or diagonally behind of the vehicle VH. Specifically, the external sensor device 40 includes a rear camera 41, a left rear side radar sensor 42L, a right rear side radar sensor 42R, a left rear side sonar sensor 43L1, a right rear side sonar sensor 43R1, a left rear sonar sensor 43L2, a right rear sonar sensor 43R2, and the like. As the object information, there are given, for example, moving objects such as other vehicles and pedestrians, and stationary objects such as walls and poles. The external sensor device 40 repeatedly transmits the acquired object information to the ECU 10 every predetermined time.

Hereinafter, when it is not necessary to distinguish between the left rear side radar sensor 42L and the right rear side radar sensor 42R, they are also referred to as "rear radar sensor 42". When it is not necessary to distinguish between the left rear side sonar sensor 43L1 and the right rear side sonar sensor 43R1 and the left rear sonar sensor 43L2 and the right rear sonar sensor 43R2, they are also referred to as "sonar sensor 43". The rear camera 41 and the rear radar sensor 42 are examples of "first detection unit" of the present disclosure, and the sonar sensor 43 is an example of "second detection unit" of the present disclosure. Although not shown in the figures, the external sensor device 40 may be further equipped with a front camera, a front radar sensor, a front side radar sensor, a front sonar sensor, a front side sonar sensor, and the like.

The rear camera 41 is, for example, a stereo camera or a monocular camera, which can be a digital camera with an image sensor such as CMOS or CCD. The rear camera 41 captures images behind the vehicle VH and processes the captured image data to obtain object information behind of the vehicle VH. The object information is information indicating the type of object detected behind the vehicle VH, the relative distance between the vehicle VH and the object, and the relative speed between the vehicle VH and the object. The type of object can be recognized, for example, by machine learning such as pattern matching.

The rear radar sensor 41 detects the object existing in a region located on the behind of the vehicle VH. The rear radar sensor 41 includes a millimeter wave radar or Lidar. The millimeter wave radar radiates a radio wave (millimeter wave) in a millimeter wave band, and receives the millimeter wave (reflected wave) reflected by the object existing within a radiation range. The millimeter wave radar acquires a relative distance between the vehicle VH and the object, a relative speed between the vehicle VH and the object, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a object, to thereby acquire a shape of the object detected in behind of the vehicle VH, the relative distance between the vehicle VH and the object, the relative speed between the vehicle VH and the object, and the like.

The sonar sensor 43 is a well-known sensor that uses ultrasonic waves. The sonar sensor 43 emits ultrasonic waves to a predetermined range behind of the vehicle VH. The sonar sensor 43 receives the reflected wave reflected by an object that exists within the ultrasonic wave emission range, and detects the presence or absence of the object and the distance between the vehicle VH and the object, etc. based on the time between the transmission and reception of the ultrasonic wave. The sonar sensor 43 can detect the object located in a vertical direction of the vehicle by emitting highly directional ultrasonic waves.

Figure 2A:
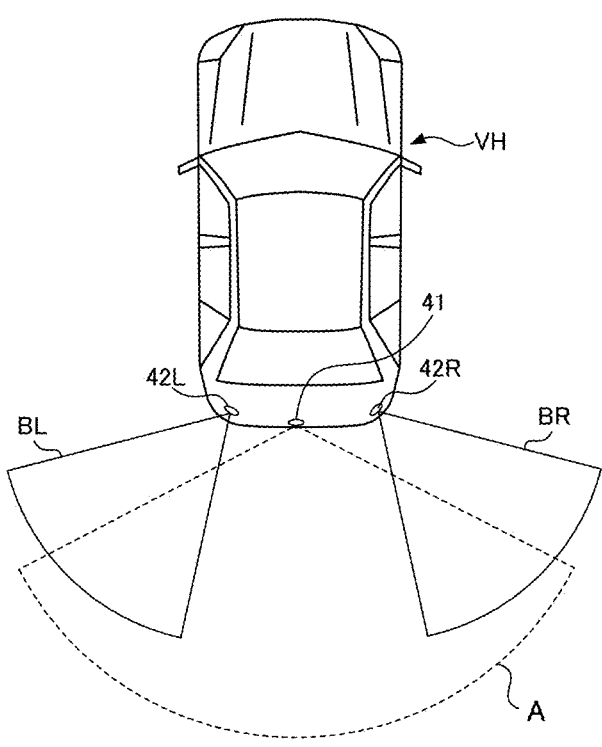
FIG. 2A is a schematic diagram showing an example of the onboard position of a rear camera, a left rear side radar sensor, and a right rear side radar sensor.

FIG. 2A is a schematic diagram showing an example of the on-board positions of the rear camera 41, the left rear side radar sensor 42L, and the right rear side radar sensor 42R. As shown in FIG. 2A, the rear camera 41 is located in the center of the rear bumper of the vehicle VH in the width direction. The imaging area A of the rear camera 41 is a wide-angle area that extends from the center of the rear bumper in the vehicle width direction toward the rear of the vehicle VH. The left rear side radar sensor 42L is provided at the left end in the rear bumper, and the right rear side radar sensor 42R is provided at the right end in the rear bumper. The detection area BL of the left rear side radar sensor 42L is a wide-angle area extending from the left end of the rear bumper toward the left rear side. The detection area BR of the right rear side radar sensor 42R is a wide-angle area extending from the right end of the rear bumper toward the right rear side.

Figure 2B:
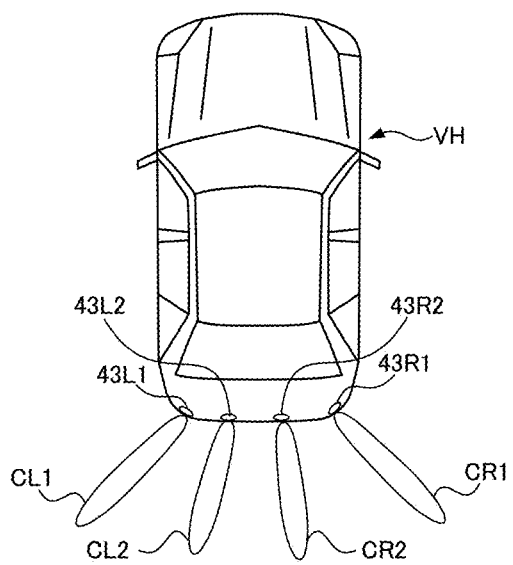
FIG. 2B is a schematic diagram showing an example of the onboard position of a left rear side sonar sensor, a left rear sonar sensor, a right rear sonar sensor, and a right rear side sonar sensor.

FIG. 2B is a schematic diagram showing an example of the on-board positions of the left rear side sonar sensor 43L1, the right rear side sonar sensor 43R1, the left rear sonar sensor 43L2, and the right rear sonar sensor 43R2. As shown in FIG. 2B, the left rear side sonar sensor 43L1 is located at the left end of the rear bumper and the right rear side sonar sensor 43R1 is located at the right end of the rear bumper. The detection area CL1 of the left rear side sonar sensor 43L1 is a relatively narrow area extending from the left end of the rear bumper toward the left rear side. The detection area CR1 of the right rear side sonar sensor 43R1 is a relatively narrow width area extending from the right end of the rear bumper toward the right rear side. The left rear sonar sensor 43L2 is located between the left end of the rear bumper and the center of the vehicle width direction, and the right rear sonar sensor 43R2 is located between the right end of the rear bumper and the center of the vehicle width direction. The detection area CL2 of the left rear sonar sensor 43L2 is a relatively narrow area extending from between the left end and the center of the rear bumper toward the left rear. The detection area CR2 of the right rear sonar sensor 43R2 is a relatively narrow width area extending from between the right end and the center of the rear bumper toward the right rear.

Referring back to FIG. 1, the HMI 60 is an interface for inputting and outputting data between the ECU 10 and the driver, and includes an input device and an output device. Examples of the input device include a touch panel, a switch, and a sound pickup microphone. Examples of the output device include a display device 61, a speaker 62, and a buzzer 63. The display device 61 is, for example, a center display installed in an instrument panel or the like, a multi-information display, a head-up display, a display of a navigation system, or the like. The speaker 62 is, for example, a speaker of an acoustic system or a navigation system.

(Software Configuration)

Figure 3:
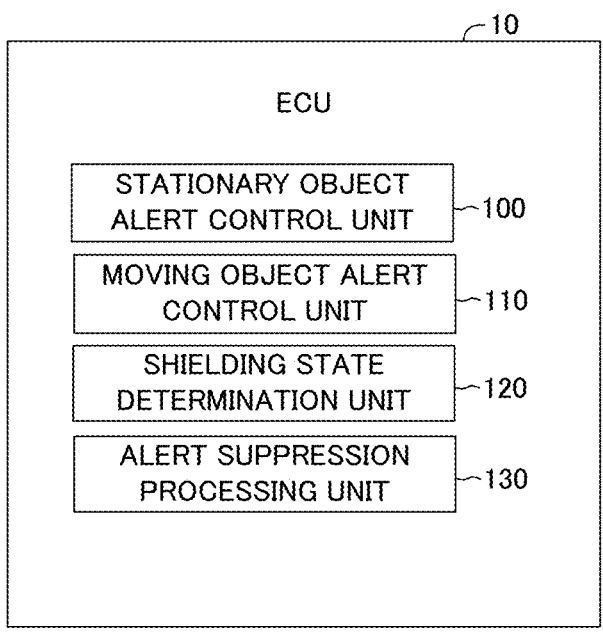
FIG. 3 is a schematic diagram showing a software configuration of a control device to the present embodiment.

FIG. 3 is a schematic diagram showing a software configuration of the ECU 10 to the present embodiment. As shown in FIG. 3, the ECU 10 includes a stationary object alert control unit 100, a moving object alert control unit 110, a shielding state determination unit 120, and an alert suppression processing unit 130, and the like as a part of functional elements. Those functional elements 100 to 130 are realized by the CPU 11 of the ECU 10 reading a program stored in the ROM 12 into the RAM 13 and executing the program. Note that all or a part of the functional elements 100 to 130 may be provided in another ECU separate from the ECU 10 or in an information processing device of a facility (a control center or the like) capable of communicating with the vehicle VH.

The stationary object alert control unit 100 acquires the distance between the own vehicle VH and the stationary object in the path of the own vehicle VH based on the detection results of the sonar sensor 43 while the vehicle VH is traveling at a predetermined speed (e.g., low speed).

Further, the stationary object alert control unit 100 executes a stationary object alerting to inform the driver of the vehicle VH of the approach to the stationary object when the execution condition is satisfied that the distance between the own vehicle VH and the stationary object is below a predetermined value. The stationary object alert control unit 100 is an example of the "second notification unit" of the present disclosure. The vehicle speed of the own vehicle VH can be obtained based on the detection result of the vehicle speed sensor 31. When the condition for executing the stationary object alerting is satisfied, the stationary object alert control unit 100 outputs alerting sounds from the speaker 62 and the buzzer 63 to alert the driver to approach the stationary object, and displays a alerting image on the display unit 61 to alert the driver to approach the stationary object. The stationary object alert may be either the alerting sound or the alerting display. The stationary object alert control unit 100 terminates the stationary object alerting when the sonar sensor 43 no longer detects a stationary object, i.e., when the execution condition is no longer satisfied.

The moving object alert control unit 110 executes a moving object alerting to inform the driver of the vehicle VH of the approaching object, when detects the moving object approaching the own vehicle VH from behind during backward travel. The moving object alert control unit 110 is an example of the "first notification unit" of the present disclosure. Whether or not the vehicle VH is traveling in backward can be determined based on whether the shift sensor 35 detects reverse R as the shift position. In the present embodiment, the moving object alert control unit 110 executes two types of moving object alert such as the rear cross-traffic alert function (RCTA function) and the rear camera detection function (RCD function).

The RCTA function is a function of notifying the driver of the own vehicle VH of the approach of the other vehicle when the other vehicle approaching from outside the region toward the left rear region of the own vehicle VH is detected on the basis of the object information transmitted from the left rear side radar sensor 42L during the backward travel of own vehicle VH or when the other vehicle approaching from outside the region toward the right rear region of the own vehicle VH is detected on the basis of the object information transmitted from the right rear side radar sensor 42R. When the execution condition for detecting another vehicle approaching from the left or right rear of the own vehicle VH based on the detection results of the rear radar sensors 42 (42L, 42R) is satisfied, the moving object alert control unit 110 outputs an alerting sound from the speaker 62 or the buzzer 63 to alert the driver of the approach of the other vehicle and the alerting image alerting the driver to the approach of another vehicle is displayed on the display device 61. The moving object alerting by the RCTA function may be either the alerting sound or the alerting display. The moving object alert control unit 110 terminates the moving object alert by the RCTA function when the rear radar sensors 42 (42L, 42R) no longer detect another vehicle approaching the own vehicle VH, that is, when the execution condition is no longer satisfied.

The RCD function notifies the driver of the own vehicle VH of the presence of the pedestrian if the pedestrian is detected behind the own vehicle VH by the rear camera 41 when the own vehicle VH is traveling backward. When the execution condition for detecting the pedestrian behind the own vehicle VH is satisfied based on the detection result of the rear camera 41, the moving object alert control unit 110 outputs alerting sounds from the speaker 62 and the buzzer 63 to alert the driver of the pedestrian's approach, and displays alerting images on the display device 61 to alert the driver of the pedestrian's approach. The moving object alert by the RCD function may be either the alerting sound or the alerting display. The moving object alert control unit 110 terminates the moving object alert by the RCD function when the rear camera 41 no longer detects pedestrians behind the vehicle VH, that is, when the execution condition is no longer satisfied.

Based on the detection results of the sonar sensor 43, the shielding state determination unit 120 determines whether or not the rear of the own vehicle VH is in a shielding state (a state in which other vehicles or pedestrians cannot pass and approach the own vehicle VH) where the vehicle is shielded by stationary objects that exist within a predetermined distance range from the own vehicle VH. Specifically, the shielding state determination unit 120 determines that the behind of the own vehicle VH is in the shielding state when all the sonar sensors 43 (43L1, 43L2, 43R2, 43R1) detect the stationary object, that is, when detecting the stationary object in four directions behind the own vehicle VH. On the other hand, when at least one or more the rear sonar sensors 43 of all the sonar sensor 43 (43L1, 43L2, 43R2, 43R1) do not detect a stationary object, the shielding state determination unit 120 determines that the behind of the own vehicle VH is not in the shielding state. The shielding state determination unit 120 transmits the determination result to the alarm suppression processing unit 130, which will be described later.

Note that the detection direction of the stationary object is not limited to four directions, and may be configured to detect the stationary object in a larger number of directions depending on the resolution and the number of mounted sonar sensors. In this case as well, when a stationary object is detected in all directions, it is determined that the behind of the own vehicle VH is in the shielded state. In addition, the determination condition can be relaxed in consideration of the detection accuracy of the sonar sensor 43. For example, once the stationary object is detected in four directions, it may be determined that the behind of the own vehicle VH is in a shielded state even if the detection of the stationary object changes in three directions thereafter. Further, when the behind (directly behind) of the own vehicle VH is covered with the stationary object over a range obtained by adding a predetermined length (buffering) to the vehicle width of the own vehicle VH, it may be determined that the behind of the own vehicle VH is shielded by a wall or the like. The directly behind of the own vehicle VH may be replaced by the traveling route of the own vehicle VH calculated based on the steering angle detected by the steering angle sensor 34. Detection of a stationary object behind of the own vehicle VH can also be detected by the rear camera 41 and/or the rear radar sensor 42.

The alert suppression processing unit 130 is an example of the "notification suppress unit" of the present disclosure, and executes an alert suppression process of suppressing the activation of one of the alerts according to the shielding state of the stationary object and the attribute of the moving object when the specific condition that the execution condition of the stationary object alert and the execution condition of the moving object alert is simultaneously satisfied are satisfied. Here, when the execution conditions of the stationary object alert and the moving object alert are satisfied at the same time, it is not meant that the timing of establishment is completely matched, but that the period in which the execution conditions of the stationary object alert and the moving object alert are satisfied with each other is at least partially superimposed. The following is a description of cases in which the execution conditions for stationary object alert and moving object alert are simultaneously satisfied, based on FIG. 4.

Figures 4A, 4B, 4C, 4D:
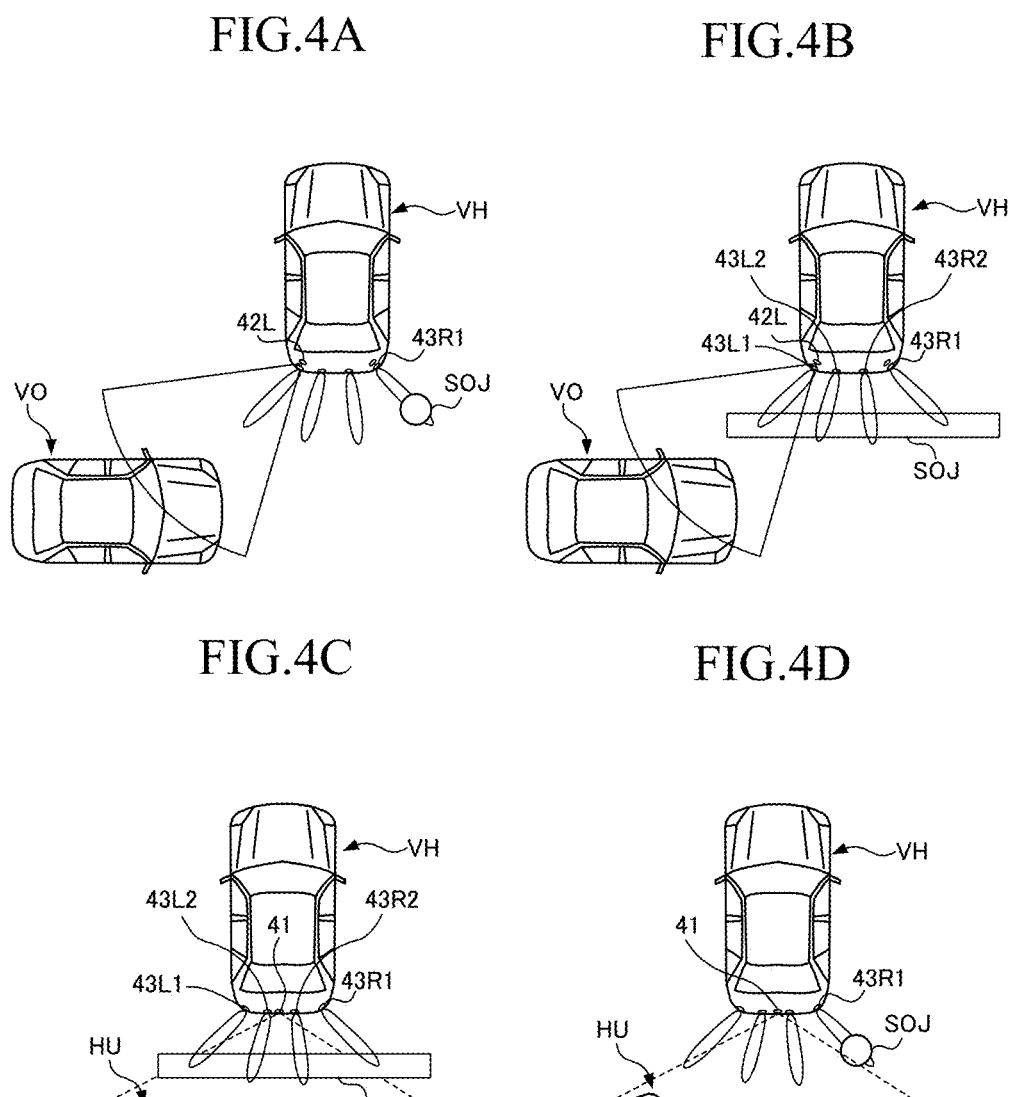
FIG. 4A is a schematic overhead view for explaining a case in which an execution conditions of a stationary object alert and a moving object alert are simultaneously satisfied.
FIG. 4B is a schematic overhead view for explaining a case in which an execution conditions of a stationary object alert and a moving object alert are simultaneously satisfied.
FIG. 4C is a schematic overhead view for explaining a case in which an execution conditions of a stationary object alert and a moving object alert are simultaneously satisfied.
FIG. 4D is a schematic overhead view for explaining a case in which an execution conditions of a stationary object alert and a moving object alert are simultaneously satisfied.

FIG. 4A shows a case in which the sonar sensor 43 (in the illustrated example, the right rear side sonar sensor 43R1) detects the stationary object SOJ such as a pole in one direction, and the rear radar sensor 42L detects another vehicle VO approaching from the left rear side of the own vehicle VH farther than the stationary object SOJ. FIG. 4B shows a case in which the sonar sensor 43 detects the stationary object SOJ (shielding object) such as a wall in all four directions, and the rear radar sensor 42L detects another vehicle VO approaching from the left rear side of the own vehicle VH farther than the stationary object SOJ. In the case shown in FIG. 4B, the shielding state determination unit 120 determines that the behind of the own vehicle VH is in the shielding state.

When the distance between the own vehicle VH and the moving object (the other vehicle VO) is greater than the distance between the own vehicle VH and the stationary object SOJ by a predetermined value or more, the alert suppression processing unit 130 determines that the moving object is located farther from the stationary object SOJ. Here, the distance from the own vehicle VH to the stationary object SOJ may be, for example, the distance to the stationary object SOJ (in the case shown in FIG. 4B, the stationary object detected by the right rear side sonar sensor 43R1) which is located farthest from the own vehicle VH among the objects detected as the stationary object SOJ. The distance to the stationary object SOJ may be an average of the distances of the plurality of stationary object SOJ detected as the stationary object SOJ, or may be a distance to the own vehicle VH to the stationary object SOJ (the stationary object detected by the left rear side sonar sensor 43L1 in the embodiment shown in FIG. 4B) that exists in substantially the same direction as the moving object (the other vehicle VO).

In any of the cases shown in FIG. 4A and FIG. 4B, the other vehicles VO are located farther from the own vehicle VH than the stationary object SOJ. Not only when there is a shield such as a wall between the own vehicle VH and the other vehicle VO, but also when there is a pole or the like, the other vehicle VO does not come close to own vehicle VH by passing through them. That is, it is considered that the driver does not need the moving object alert by the RCTA function.

When the sonar sensor 43 (43L1, 43L2, 43R2, 43R1) detects the stationary object SOJ in at least one direction and the rear radar sensor 42 detects the other vehicle VO farther than the stationary object SOJ, the alert suppression processing unit 130 suppresses the moving object alert of the RCTA function by the moving object alert control unit 110. That is, the stationary object alert by the stationary object alert control unit 100 is prioritized. This effectively prevents unnecessary activation of the moving object alert based on the other vehicle VO that are not likely to pass through the stationary objects SOJ, thereby effectively preventing drivers from being troubled.

FIG. 4C shows a case in which the sonar sensor 43 detects the stationary object SOJ (shielding object) such as the wall or the like in all four directions, and the rear camera 41 detects the pedestrian HU approaching the own vehicle VH from behind farther than the stationary object SOJ. In the case shown in FIG. 4C, the shielding state determination unit 120 determines that the behind of the own vehicle VH is in the shielding state, and the space between the own vehicle VH and the pedestrian HU is shielded by the wall, a wire mesh, or the like. In such cases, the pedestrian HU is unlikely to pass through the stationary object SOJ and approach the own vehicle VH. That is, it is considered that the driver does not need the moving object alert by the RCD function.

The alert suppression processor unit 130 suppresses the moving object alert of the RCD function by the moving object alert control unit 110 when the shielding state determiner 120 determines that the behind of the own vehicle VH is in the shielding state, that is, when the sonar sensor 43 (43L1, 43L2, 43R2, 43R1) detects the stationary object SOJ in all four directions and the rear camera 41 detects the pedestrian HU farther than the stationary object SOJ. That is, the stationary object alert by the stationary object alert control unit 100 is prioritized. This effectively prevents unnecessary activation of the moving object alert based on the pedestrian HU that are not likely to pass through the stationary objects SOJ, thereby effectively preventing drivers from being troubled.

FIG. 4D shows a case where the sonar sensor 43 (in the illustrated example, the right rear side sonar sensor 43R1) detects the stationary object SOJ such as the pole in one direction, and the rear camera 41 detects the pedestrian HU approaching the own vehicle VH from the rear side farther than the stationary object SOJ. In the case shown in FIG. 4D, the space between the own vehicle VH and the pedestrian HU is not completely shielded. In such cases, the pedestrian HU may pass through the stationary object SOJ and approach the own vehicle VH. That is, the drivers feel that they need the moving object alert by the RCD function.

Even when the rear camera 41 detects the pedestrian HU farther than the stationary object SOJ, the alert suppression process unit 130 does not suppress the moving object alert of the RCD function by the moving object alert control unit 110 when the shielding state determiner unit 120 determines that the behind of the own vehicle VH is not in the shielding state. That is, the moving object alert targeted to the pedestrian by the moving object alert control unit 110 is prioritized. As a result, the moving object alert that the driver feels necessary is reliably activated, and the alert can be optimized.

Figure 5:
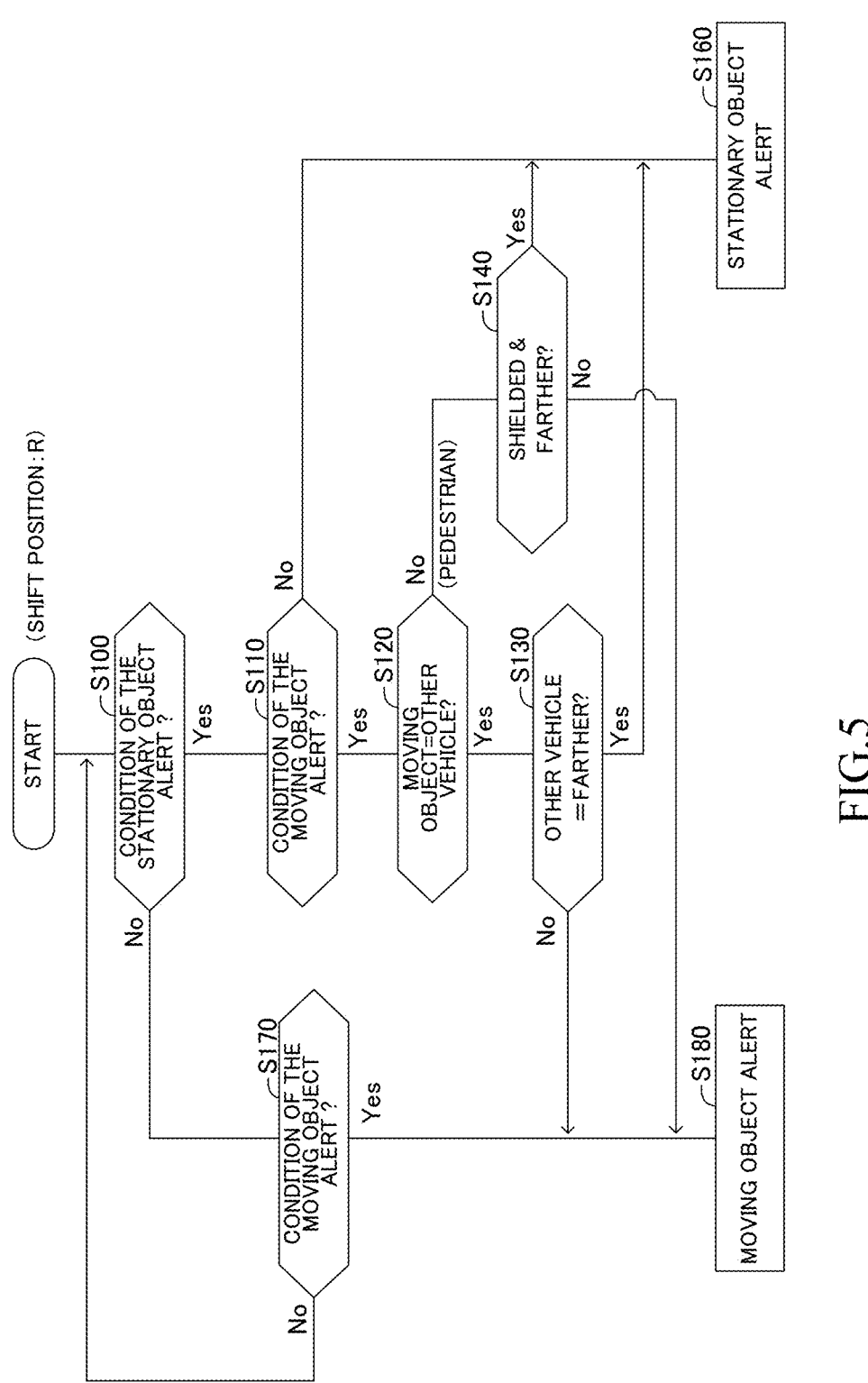
FIG. 5 is a flow chart for explaining a flow of an alert control and an alert suppressing process by the control device according to the present embodiment.

Next, a routine of the alert control and the alert suppressing process by the CPU 11 of the ECU 10 will be described with reference to FIG. 5. This routine is started, for example, when the shift sensor 35 detects the reverse R as the shift position.

In step S100, the ECU 10 determines whether or not the condition for executing the stationary object alert is satisfied based on the detection result of the sonar sensor 43. If the execution condition of the stationary object alert is satisfied (Yes), the ECU 10 advances the process to step S110. On the other hand, if the execution condition of the stationary object alert is not satisfied (No), the ECU 10 advances the process to step S170.

In step S170, the ECU 10 determines whether or not the execution condition of the moving object alert is satisfied based on the radar sensor 42 and/or the rear camera 41. If the execution condition of the moving object alert is not satisfied (No), the ECU 10 returns the determination process of step S100. On the other hand, if the execution condition of the moving object alert is satisfied (Yes), the ECU 10 advances the process to step S180 and executes the moving object alert.

In step S110, the ECU 10 determines whether or not the execution condition of the moving object alert is satisfied based on the detection results of the rear radar sensor 42 and/or the rear camera 41. If the execution condition of the moving object alert is not satisfied (No), the ECU 10 advances the process to step S160 and executes the stationary object alert. In such cases, the ECU 10 does not executes the moving object alert. On the other hand, if the execution condition of the moving object alert is satisfied (Yes), the ECU 10 advances the process to step S120.

In step S120, the ECU 10 determines whether the moving object detected behind the own vehicle VH is the other vehicle VO approaching the own vehicle VH. If the moving object is the other vehicle VO (Yes), the ECU 10 advances the process to step S130. On the other hand, if the moving object is not the other vehicle VO (NO), that is, when the moving object is the pedestrian HU approaching the own vehicle VH from the behind, the ECU 10 advances the process to step S140.

In step S130, the ECU 10 determines whether the other vehicle VO is located farther from the own vehicle VH than the stationary object SOJ. If the other vehicle VO is located farther than the stationary object SOJ (Yes), the other vehicle VO does not pass through the stationary object SOJ and approach, so that the moving object alert is not required. In this case, the ECU 10 advances the process to step S160 and executes the stationary object alert, that is, does not execute the moving object alert. On the other hand, if the other vehicle VO does not exist farther than the stationary object SOJ (No), the other vehicle VO may approach the own vehicle VH. Then, the ECU 10 advances the process to step S180 and executes the moving object alert.

In step S140, the ECU 10 determines whether the behind of the own vehicle VH is shielded and the pedestrian HU, which is the moving object, is located farther from the own vehicle VH than the stationary object SOJ. If the behind of the own vehicle VH is shielded and the pedestrian HU is further away than the stationary object SOJ (Yes), it is unlikely that the pedestrian HU will pass through the stationary object and approach the own vehicle VH. In this case, the ECU 10 advances the process to step S160 and executes the stationary object alert, that is, does not execute the moving object alert. On the other hand, if the behind of the own vehicle VH is unobstructed or the pedestrian HU is not further away than the stationary object SOJ (No), the pedestrian HU may approach the own vehicle VH. Then, the ECU 10 advances the process to step S180 and executes the moving object alert.

In the above, the vehicle control device and the vehicle control method according to the at least one embodiment have been described, but the present disclosure is not limited to the above-mentioned at least one embodiment, and various modifications are possible within the range not departing from the object of the present disclosure.

For example, in the above-described embodiment, the alarm suppression processing unit 130 controls both the alerting sound and the alerting display when suppressing the moving object alert or the stationary object alert, but may be configured to suppress only one of the alerting sound and the alerting display. Further, although the moving object alert control unit 110 has been described as notifying the approach of the other vehicle by the RCTA function and notifying the driver of the approach of the pedestrian by the RCD function, when detecting the other vehicle or the pedestrian, the present disclosure can also be applied to a system that simply notifies the other vehicle or the pedestrian as a moving object without distinguishing the properties.

What is claimed is:

1. A vehicle control device, comprising:

a first notification unit configured to notify a driver of an own vehicle of a moving object, when the moving object approaching from outside to a predetermined area located in a path of travel of the own vehicle and located within a predetermined distance from the own vehicle is detected by a first detection unit;

a second notification unit configured to notify the driver of an approach to a stationary object, when the stationary object existing in a predetermined area in which a distance from the own vehicle is within a predetermined range is detected by a second detection unit; and a notification suppress unit configured to suppress, when a specific condition is satisfied where the second detection unit detects the stationary object and the first detection unit detects the moving object farther away from the own vehicle than the stationary object, the notification by the first notification unit if an attribute of the moving object is a first attribute, and configured to suppress, if the attribute of the moving object is a second attribute different from the first attribute, the notification by the first notification unit only when the second detection unit detects the stationary object over a predetermined range in a width direction of the own vehicle.

2. The vehicle control device according to claim 1, wherein the second detection unit is a sonar sensor provided at a plurality of widthwise positions of the own vehicle; and wherein the notification suppress unit is configured to suppress, when the specified condition is satisfied, and when the attribute of the moving object is the second attribute, the notification by the first notification unit only when a predetermined number or more of the sonar sensors among the plurality of sonar sensors detect the stationary object.

3. The vehicle control device according to claim 1, wherein the first detection unit is configured to detect another vehicle and a pedestrian approaching the own vehicle as the moving object; and wherein the notification suppress unit is configured to determine the attribute of the moving object as the first attribute, when the moving object is the another vehicle, and determine the attribute of the moving object as the second attribute, when the moving object is the pedestrian.

4. The vehicle control device according to claim 3, wherein the first detection unit includes at least a radar sensor configured to detect the another vehicle and a camera configured to detect at least the pedestrian.

5. A vehicle control method, comprising:

executing a first notification to notify a driver of an own vehicle of a moving object, when the moving object approaching from outside to a predetermined area located in a path of travel of the own vehicle and located within a predetermined distance from the own vehicle is detected by a first detection unit;

executing a second notification to notify the driver of an approach to a stationary object, when the stationary object existing in a predetermined area in which a distance from the own vehicle is within a predetermined range is detected by a second detection unit; and suppressing, when a specific condition is satisfied where the second detection unit detects the stationary object and the first detection unit detects the moving object farther away from the own vehicle than the stationary object, the first notification if an attribute of the moving object is a first attribute, and suppressing, if the attribute of the moving object is a second attribute different from the first attribute, the first notification only when the second detection unit detects the stationary object over a predetermined range in a width direction of the own vehicle.

* * * * *